3,283,818
REMOVAL OF WATER BLOCKS FROM OIL AND
GAS WELLS
Melcon Santourian, Bartlesville, Okla., assignor to Phillips Petroleum Company, a corporation of Delaware
No Drawing. Filed Dec. 31, 1963, Ser. No. 334,936
5 Claims. (Cl. 166—42)

This invention relates to a process for removing a water block around a hydrocarbon-producing well.

In the production of oil and gas from a producing well in a hydrocarbon-bearing stratum, the zone around the well bore sometimes develops a condition of reduced permeability which results in a decrease in production of hydrocarbon from the well. One cause of this reduced permeability is the accumulation of water in the producing formation in the region adjacent the well bore. This water accumulation, conventionally designated "water block," may be due to injected water, as from drilling or workover operations or to interstitial water gradually appearing around the well bore. One method commonly proposed for the removal of such a water block comprises injecting into the blocked stratum a water-miscible solvent, with or without certain additives, to effect solubilization and displacement of the water. However, this method is rather ineffective in most instances in view of the fact that the proposed technique displaces the water in the water block deeper into the formation. Later when production is resumed the water returns to block the well again.

This invention is concerned with a method of effectively overcoming the water block problem.

Accordingly it is an object of the invention to provide an effective process for removing a water block around a hydrocarbon-producing well. Another object is to provide a process which alleviates water block and which increases the production of hydrocarbons from a well. Other objects of the invention will become apparent upon consideration of the accompanying disclosure.

A broad aspect of the invention comprises injecting into a hydrocarbon-bearing stratum through a production well, gas which is at least partially soluble in the stratum water so as to build up a relatively high pressure substantially less than fracturing pressure, thereafter shutting the well in for a substantial period such as an hour to several days to allow the gas to go into solution, and thereafter suddenly opening the well so as to release the built up pressure, thereby effecting production of water from the water block through the well. Production through the well is then continued in normal manner without the obstruction of the water block.

Any gas which is non-deleterious to the stratum and to the oil therein and which is at least partially soluble in the stratum aqueous liquid is suitable for use in the process. The gaseous material for the injection step is chosen such that its critical temperature is lower than the reservoir temperature, thus preventing its liquefaction under the high pressure employed. Examples of suitable gaseous materials include carbon dioxide, nitrogen, methane, ethane, and flue gas as well as combinations thereof.

Usually the shut-in period will range from several hours to several days, depending upon the type of gaseous material used and its degree of solubility in water. When the pressure is suddenly released after the shut-in period, the water is carried from the formation into the well by a solution-gas drive. If necessary the operation is repeated one or more times to complete removal of the interfering water block.

Although the method of this invention may be applied to both oil and gas wells containing water blocks, it has its greatest utility when used in oil wells where the mobility of the reservoir fluids is not great. It is especially useful in removing water blocks from zones around oil wells in fields containing very high viscosity oil, i.e., oil of low gravity, with considerable resistance to flow. In such fields the injected gas is better confined to the zone occupied by the water block, and a more rapid pressure build-up is possible. Thus, the method is applicable to the Monagas field in Venezuela, where difficulties with water blocks are being experienced. There are similar type fields in the United States where difficulties with water blocks are also not uncommon.

The maximum injection pressure to be built up in the production well depends upon the depth and character of the stratum from which the water block is to be removed. In most cases the fracturing pressure increases at the rate of one p.s.i. for each foot of depth so that a stratum 3000′ deep has a fracturing pressure of substantially 3000 p.s.i. Usually it is undesirable to fracture the stratum and the injection pressure must not be built up sufficient to cause fracturing. The gaseous material selected for the process is injected at a rate and pressure high enough to rapidly build up the pressure at the well head to a value approaching but not exceeding the overburden pressure. The common margin of safety is 50 to 500 p.s.i. less than the fracturing pressure, depending upon the depth and structure of the stratum. Some strata have little or no resistance to partition while others have a substantial resistance thereto.

Certain modifications of the invention will become apparent to those skilled in the art and the illustrative details disclosed are not to be construed as imposing unnecessary limitations on the invention.

I claim:
1. A process for removing a water block adjacent a production well within a hydrocarbon-bearing stratum which develops during production of hydrocarbons from said well comprising the steps of:
   (1) terminating production of hydrocarbons from said well;
   (2) injecting directly into said stratum thru said well, gas which is at least partially soluble in stratum water to build up a high pressure thereof but below a fracturing pressure and cause said gas to go into solution in said water;
   (3) shutting the well in for a period in the range of an hour to several days to allow said gas to go into solution;
   (4) thereafter, suddenly opening said well to release said pressure, thereby effecting production of water in said water block thru said well; and
   (5) thereafter, producing hydrocarbons thru said well.

2. The process of claim 1 wherein said gas is $CO_2$.
3. The process of claim 1 wherein said gas is flue gas.
4. The process of claim 1 wherein said gas is a $C_1$–$C_2$ hydrocarbon.
5. The process of claim 1 wherein steps (1), (2), (3), and (4) are repeated to increase the amount of water produced by solution-gas drive.

References Cited by the Examiner

UNITED STATES PATENTS

| | | | |
|---|---|---|---|
| 2,776,714 | 1/1957 | Stanclift et al. | 166—42 |
| 2,788,855 | 4/1957 | Peterson | 166—42 |
| 2,964,109 | 12/1960 | Martin | 166—43 |
| 3,100,528 | 8/1963 | Plummer et al. | 166—42 X |
| 3,123,134 | 3/1964 | Kyte et al. | 166—2 |

JACOB L. NACKENOFF, *Primary Examiner.*

S. J. NOVOSAD, *Assistant Examiner.*